United States Patent [19]
Kodama

[11] Patent Number: 5,805,998
[45] Date of Patent: Sep. 8, 1998

[54] CORDLESS TELEPHONE APPARATUS

[75] Inventor: Yoshisuke Kodama, Fukuoka, Japan

[73] Assignee: Matsushita Electric Industrial Co., Ltd., Japan

[21] Appl. No.: 498,479

[22] Filed: Jul. 5, 1995

[30] Foreign Application Priority Data

Jul. 20, 1994 [JP] Japan .................................. 6-167940

[51] Int. Cl.⁶ .................................................. H04Q 7/18
[52] U.S. Cl. ........................ 455/462; 455/572; 455/573; 455/561; 320/13; 320/14
[58] Field of Search ............................. 379/61; 455/38.3, 455/127, 343, 462, 572, 573, 575, 574, 569, 561; 320/13, 14, 2

[56] References Cited

U.S. PATENT DOCUMENTS

| | | |
|---|---|---|
| 4,039,760 | 8/1977 | Gregory et al. ........................ 455/403 |
| 4,509,201 | 4/1985 | Sekigawa et al. ...................... 455/572 |
| 4,995,072 | 2/1991 | Pedigo .................................... 455/462 |
| 5,111,499 | 5/1992 | Umemoto et al. ...................... 455/462 |
| 5,115,182 | 5/1992 | Ehmke et al. .......................... 455/573 |
| 5,177,426 | 1/1993 | Nakanishi et al. ..................... 455/573 |
| 5,426,690 | 6/1995 | Hikuma et al. ........................ 455/403 |
| 5,475,734 | 12/1995 | Mcdonald et al. .................... 455/403 |

Primary Examiner—Dwayne D. Bost
Assistant Examiner—Keith Ferguson
Attorney, Agent, or Firm—Rossi & Associates

[57] ABSTRACT

A cordless telephone apparatus includes a radio transceiver for cordless communication with a slave unit. A controller is operative for controlling the radio transceiver. A main power supply is operative for generating electric power from commercial ac power. An auxiliary battery is operative for generating electric power. The radio transceiver and the controller are activated by either the electric power generated by the main power supply or the electric power generated by the auxiliary battery. A voice amplifier connected between an external telephone line and the radio transceiver is operative for amplifying a speech signal transmitted between the external telephone line and the radio transceiver. The voice amplifier is activated by electric power fed from the external telephone line.

12 Claims, 4 Drawing Sheets

CORDLESS TELEPHONE APPARATUS

BACKGROUND OF THE INVENTION

1. Field of the Invention

This invention relates to a cordless telephone apparatus including a master unit connected to a telephone line, and a slave unit capable of communicating with the master unit by wireless.

2. Description of the Prior Art

Cordless telephone apparatuses include a master unit connected to a telephone line, and a slave unit capable of communicating with the master unit by wireless. Generally, the master unit is activated by commercial ac power.

In some cordless telephone apparatuses, a master unit is provided with a countermeasure to a power failure, and communication with a telephone line can be executed via a slave unit even when a stoppage of ac power occurs.

One type of such cordless telephone apparatuses furnishes a master unit with an auxiliary power supply. In the event of a stoppage of ac power supply, the master unit is activated by the auxiliary power supply so that the master unit and a slave unit can communicate with each other.

SUMMARY OF THE INVENTION

It is an object of this invention to provide an improved cordless telephone apparatus.

A first aspect of this invention provides a cordless telephone apparatus for communication with a slave unit which comprises a radio transceiver for cordless communication with the slave unit; a controller for controlling the radio transceiver; a main power supply for generating electric power from commercial ac power; an auxiliary battery for generating electric power; means for activating the radio transceiver and the controller by either the electric power generated by the main power supply or the electric power generated by the auxiliary battery; a voice amplifier connected between an external telephone line and the radio transceiver for amplifying a speech signal transmitted between the external telephone line and the radio transceiver; and means for activating the voice amplifier by electric power fed from the external telephone line.

A second aspect of this invention is based on the first aspect thereof, and provides a cordless telephone further comprising means for suspending the activation of the radio transceiver and the controller by the auxiliary battery when a voltage across the auxiliary battery drops below a given voltage.

A third aspect of this invention is based on the second aspect thereof, and provides a cordless telephone further comprising means for detecting a voltage across the auxiliary battery, means for deciding whether or not the detected voltage across the auxiliary battery is lower than a predetermined reference level, the predetermined reference level being higher than the given voltage, and means for informing the slave unit of a voltage drop when the detected voltage across the auxiliary battery is lower than the predetermined reference level.

A fourth aspect of this invention provides a cordless telephone apparatus comprising a master unit; and a slave unit; wherein the master unit comprises a radio transceiver for cordless communication with the slave unit; a controller for controlling the radio transceiver; a main power supply for generating electric power from commercial ac power; an auxiliary battery for generating electric power; means for activating the radio transceiver and the controller by either the electric power generated by the main power supply or the electric power generated by the auxiliary battery; a voice amplifier connected between an external telephone line and the radio transceiver for amplifying a speech signal transmitted between the external telephone line and the radio transceiver, and means for activating the voice amplifier by electric power fed from the external telephone line.

A fifth aspect of this invention is based on the fourth aspect thereof, and provides a cordless telephone apparatus wherein the master unit further comprises means for suspending the activation of the radio transceiver and the controller by the auxiliary battery when a voltage across the auxiliary battery drops below a given voltage.

A sixth aspect of this invention is based on the fifth aspect thereof, and provides a cordless telephone wherein the master unit further comprises means for detecting a voltage across the auxiliary battery, means for deciding whether or not the detected voltage across the auxiliary battery is lower than a predetermined reference level, the predetermined reference voltage being higher than the given voltage, and means for informing the slave unit of a voltage drop when the detected voltage across the auxiliary battery is lower than the predetermined reference level.

A seventh aspect of this invention provides a cordless telephone apparatus comprising a master unit having a main portion and an interface portion, the interface portion being connected between an external telephone line and the main portion; a slave unit for cordless communication with the master unit; a main power supply for generating electric power from commercial ac power; means for normally activating the main portion of the master unit by the electric power generated by the main power supply; an auxiliary battery for generating electric power; means for activating the main portion of the master unit by the electric power generated by the auxiliary battery in place of the electric power generated by the main power supply when a stoppage of the commercial ac power occurs; a voice amplifier provided in the interface portion of the master unit for amplifying a speech signal transmitted between the external telephone line and the main portion of the master unit; and means for activating the voice amplifier by electric power fed from the external telephone line.

An eighth aspect of this invention is based on the seventh aspect thereof, and provides a cordless telephone apparatus further comprising means for suspending the activation of the main portion of the master unit by the auxiliary battery when a voltage across the auxiliary battery drops below a given voltage.

A ninth aspect of this invention is based on the seventh aspect thereof, and provides a cordless telephone further comprising means for detecting a voltage across the auxiliary battery, means for deciding whether or not the detected voltage across the auxiliary battery is lower than a predetermined reference level, and means for informing the slave unit of a voltage drop when the detected voltage across the auxiliary battery is lower than the predetermined reference level.

A tenth aspect of this invention is based on the seventh aspect thereof, and provides a cordless telephone apparatus further comprising means for detecting a voltage across the auxiliary battery, means for deciding whether or not the detected voltage across the auxiliary battery is lower than a predetermined reference level, an indicator provided in the slave unit, and means for activating the indicator when the detected voltage across the auxiliary battery is lower than the predetermined reference level.

An eleventh aspect of this invention provides a cordless telephone apparatus comprising a master unit having a main portion, an interface portion connected between an external telephone line and the main portion, and means for isolating the main portion and the external telephone line from each other with respect to a direct current; a slave unit for cordless communication with the master unit; a main power supply for generating electric power from commercial ac power; means for normally activating the main portion of the master unit by the electric power generated by the main power supply; an auxiliary battery for generating electric power; means for activating the main portion of the master unit by the electric power generated by the auxiliary battery in place of the electric power generated by the main power supply when a stoppage of the commercial ac power occurs; a voice amplifier provided in the interface portion of the master unit at a location between the external telephone line and the isolating means for amplifying a speech signal transmitted between the external telephone line and the main portion of the master unit; and means for activating the voice amplifier by electric power fed from the external telephone line.

A twelfth aspect of this invention is based on the eleventh aspect thereof, and provides a cordless telephone apparatus further comprising means for suspending the activation of the main portion of the master unit by the auxiliary battery when a voltage across the auxiliary battery drops below a given voltage.

A thirteenth aspect of this invention is based on the eleventh aspect thereof, and provides a cordless telephone apparatus further comprising means for detecting a voltage across the auxiliary battery, means for deciding whether or not the detected voltage across the auxiliary battery is lower than a predetermined reference level, and means for informing the slave unit of a voltage drop when the detected voltage across the auxiliary battery is lower than the predetermined reference level.

DESCRIPTION OF THE PREFERRED EMBODIMENTS

Figure 1:
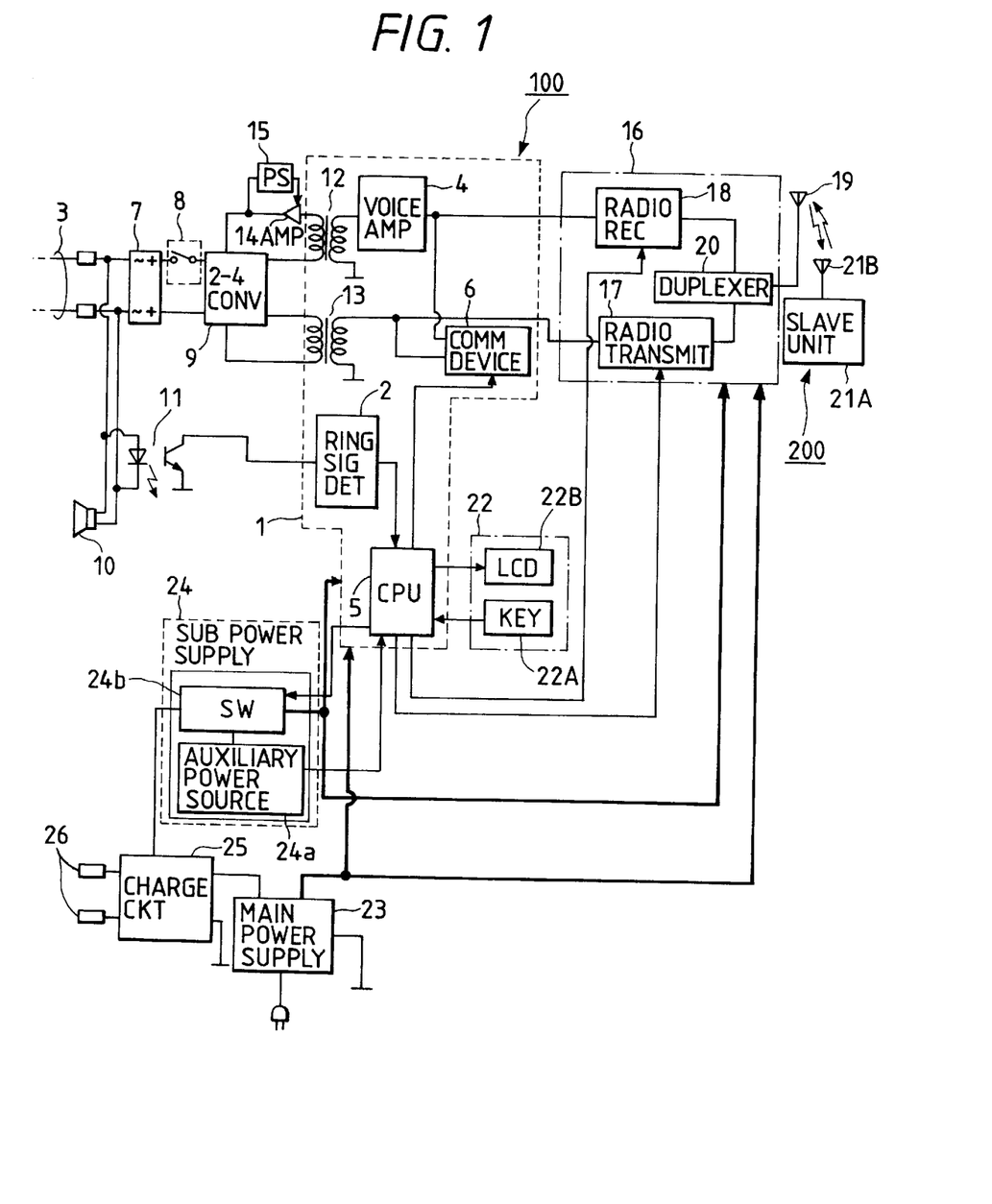
FIG. 1 is a diagram of a cordless telephone apparatus according to a first embodiment of this invention.

With reference to FIG. 1, a cordless telephone apparatus includes a master unit 100 and a slave unit 200. The master unit 100 and the slave unit 200 can communicate with each other by wireless. The slave unit 200 is powered by a secondary battery or a rechargeable battery contained therein.

The master unit 100 includes a main controller 1 which is normally activated by dc power fed from a main power supply 23. The main controller 1 has a ring signal detector 2 which serves to detect a ring signal incoming via an external telephone line 3. The main controller 1 also has a voice amplifier (an audio amplifier) 4, a CPU 5, and a communication device 6. The voice amplifier 4 is interposed in a signal path in a transmitting side. The voice amplifier 4 is connected to a transmitting-side line transformer 12 for dc cut-off. The CPU 5 is connected to the ring signal detector 2 and the communication device 6. The CPU 5 includes a combination of an interface (an input/output port), a RAM, a ROM, and a processor. The CPU 5 operates in accordance with a program stored in the ROM. The communication device 6 executes a process of transmitting a dial signal to the external telephone line 3, and a process of starting telephonic communication. The communication device 6 is connected to the transmitting-side line transformer 12 via the voice amplifier 4. The communication device is also connected to a receiving-side line transformer 13 for dc cut-off.

As will be described later, the ring signal detector 2, the voice amplifier 4, the CPU 5, the communication device 6, and other portions of the main controller 1 can be activated by either dc electric power from the main power supply 23 or dc electric power from a sub power supply 24.

The master unit 100 includes a line interface for providing connection with the external telephone line 3. The line interface has a bridge rectifier 7, a line switch 8, and a 2-line to 4-line converter (a 2–4 converter) 9. The bridge rectifier 7 is connected to the external telephone line 3. The bridge rectifier 7, the line switch 8, and the 2–4 converter 9 are sequentially connected in that order. The 2–4 converter 9 is connected to the receiving-side line transformer 13. The line switch 8 is closed and opened in response to an on-hook process and an off-hook process executed by a user.

Also, the line switch 8 is actuated by a control signal from the main controller 1 when a call incoming signal is received.

The line interface has a sounder 10 and a photocoupler 11. The sounder 10 is connected to the external telephone line 3. The sounder 10 produces sound in response to a ring signal coming from the external telephone line 3. The photocoupler 11 is disposed between the external telephone line 3 and the ring signal detector 2 to electrically isolate the external telephone line 3 and the ring signal detector 2 from each other.

The line interface has a voice amplifier (an audio amplifier) 14 and a local power supply 15. The voice amplifier 14 is connected between the transmitting-side line transformer 12 and the 2–4 converter 9. The local power supply 15 is connected to the voice amplifier 14 and the 2–4 converter 9. When the line switch 8 is closed, the local power supply 15 is connected to the external telephone line 3 via the 2–4 converter 9, the line switch 8, and the bridge rectifier 7 so that the local power supply 15 receives electric power from the external telephone line 3. The local power supply 15 derives dc power from the electric power fed by the external telephone line 3, and feeds the dc power to the voice amplifier 14. The voice amplifier 14 is activated by the dc power from the local power supply 15. Thus, the voice amplifier 14 is activated by electric power fed from the external telephone line 3.

As previously described, the main controller 1 is normally activated by the dc power fed from the main power supply 23. The photocoupler 11, the transmitting-side line transformer 12, and the receiving-side line transformer 13 dc-isolate the line interface and the main controller 1 from each other. Accordingly, the external telephone line 3 and the main power supply 23 are isolated from each other.

The master unit 100 includes a radio transceiver 16 for providing wireless communication with the slave unit 200.

Communication between the slave unit 200 and the external telephone line 3 is enabled via the radio transceiver 16. The radio transceiver 16 is normally activated by the dc power fed from the main power supply 23.

The radio transceiver 16 has a radio transmitter 17, a radio receiver 18, and a duplexer 20. The radio transmitter 17 is connected to the receiving-side line transformer 13 and the communication device 6. The radio transmitter 17 is connected to an antenna 19 via the duplexer 20. The radio transmitter 17 is also connected to the CPU 5. The radio transmitter 17 converts a speech signal or an LED-on signal into a corresponding radio signal, and feeds the radio signal to the antenna 19 via the duplexer 20. The radio signal is radiated from the antenna 19, being received by the slave unit 200. The radio receiver 18 is connected to the antenna 19 via the duplexer 20. The radio receiver 18 is connected to the voice amplifier 4 and the communication device 6. The radio receiver 18 is also connected to the CPU 5. A radio signal transmitted from the slave unit 200 is caught by the antenna 19, being fed to the radio receiver 18 via the duplexer 20. The radio receiver 18 demodulates the radio signal into a speech signal. The radio transmitter 17 and the radio receiver 18 are controlled by signals outputted from the CPU 5.

As will be described later, the radio transmitter 17, the radio receiver 18, and other portions of the radio transceiver 16 can be activated by either the dc electric power from the main power supply 23 or the dc electric power from the sub power supply 24.

As previously described, the radio transceiver 16 is normally activated by the dc power fed from the main power supply 23. The line interface and the radio transceiver 16 are dc-isolated from each other by the transmitting-side line transformer 12 and the receiving-side line transformer 13. In addition, the line interface and the antenna 19 connected to the radio transceiver 16 are dc-isolated from each other by the transmitting-side line transformer 12 and the receiving-side line transformer 13. Accordingly, the radio transceiver 16, the antenna 19, and the main power supply 23 are isolated from the external telephone line 3.

The master unit 100 includes an operating section 22 having an array 22A of keys and a liquid crystal display (LCD) 22B. The key array 22A and the LCD 22B are connected to the CPU 5. The key array 22A can be actuated by the user. The key array 22A generates a signal in response to the actuation thereof. The signal generated by the key array 22A is fed to the CPU 5. The LCD 22B is controlled by a signal outputted from the CPU 5.

The main power supply 23 provided in the master unit 100 can be connected to a commercial ac line. The main power supply 23 is connected to the main controller 1 and the radio transceiver 16. The main power supply 23 derives dc power from ac power fed by the commercial ac line. The main power supply 23 feeds the dc power to the main controller 1 and the radio transceiver 16 to activate them.

The master unit 100 includes the sub power supply 24 which is connected to the main power supply 23 via a charging circuit 25.

The sub power supply 24 is connected to the main controller 1 and the radio transceiver 16. The sub power supply 24 uses the dc power generated by the main power supply 23, and produces secondary dc power therefrom. The sub power supply 24 is normally inactive with respect to the main controller 1 and the radio transceiver 16. In the event of a stoppage of the ac power, the sub power supply 24 becomes active and supplies the secondary dc power to the main controller 1 and the radio transceiver 16 to activate them. Thus, in the event of a stoppage of the ac power, the sub power supply 24 replaces the main power supply 23.

The sub power supply 24 includes an auxiliary power source 24a and a switch 24b. The auxiliary power source 24a is connected to the charging circuit 25 via the switch 24b. The auxiliary power source 24a is connected via the switch 24b to the main controller 1 and the radio transceiver 16. The auxiliary power source 24a is a secondary battery or a rechargeable battery. The rating voltage of the auxiliary power source 24a is equal to, for example, 4 V.

Normally, the auxiliary power supply 24a is charged by the charging circuit 25 which uses the dc power fed from the main power supply 23. In the event of a stoppage of the ac power, the auxiliary power source 24a feeds dc power to the main controller 1 and the radio transceiver 16 via the switch 24b. The switch 24b responds to the voltage across the auxiliary power source 24a. When the voltage across the auxiliary power source 24a drops below a given level, the switch 24b changes to an off state or an open state to prevent over discharge of the auxiliary power source 24a.

It is preferable to provide at least two rechargeable batteries each usable for the drive of the slave unit 200. One of the rechargeable batteries is actually used by the slave unit 200 while the other is spare. The auxiliary power source 24a can be the spare battery.

The main power supply 23 is designed so that the output voltage of the main power supply 23 is approximately equal to the voltage across the auxiliary power source 24a. The main controller 1 and the radio transceiver 16 can be activated by the dc power from the main power supply 23 or the dc power from the sub power supply 24 (the auxiliary power source 24a).

The charging circuit 25 derives a charging current from the dc power outputted by the main power supply 23. The charging circuit 25 feeds the charging current to the auxiliary power source 24a to charge the latter. The charging circuit 25 is connected to a charging terminal 26. When the slave unit 200 is located in a given position on the master unit 100, a rechargeable battery within the slave unit 200 is coupled to the charging circuit 25 via the charging terminal 26 so that the rechargeable battery within the slave unit 200 can be charged by the charging current outputted from the charging circuit 25.

Figure 2:
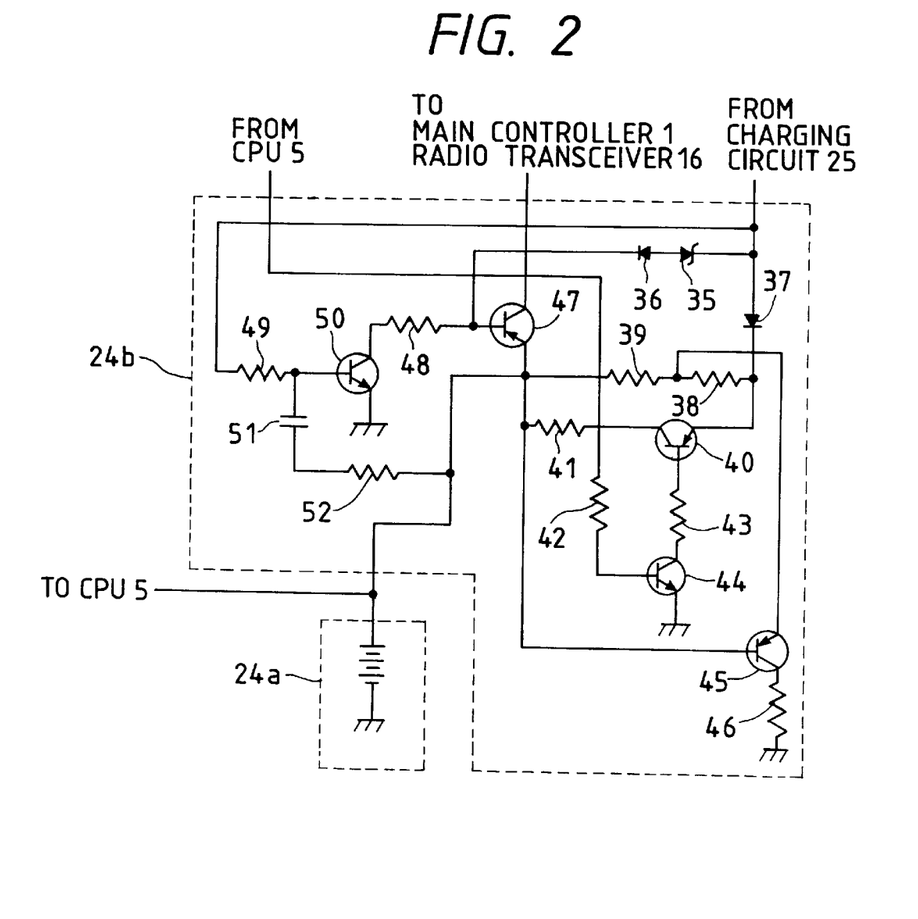
FIG. 2 is a schematic diagram of a switch and an auxiliary power source in the apparatus of FIG. 1.

As shown in FIG. 2, the switch 24b in the sub power supply 24 includes PNP transistors 40, 45, and 47, NPN transistors 44 and 50, diodes 36 and 37, a zener diode 35, a capacitor 51, and resistors 38, 39, 41, 42, 43, 46, 48, 49, and 52. The anode of the diode 37 is connected to the positive output terminal of the charging circuit 25 (the positive output terminal of the main power supply 23). It should be noted that the negative output terminal of the charging circuit 25 (the negative output terminal of the main power supply 23) is grounded. The cathode of the diode 37 is connected to the emitter of the transistor 40. The cathode of the diode 37 is also connected via a series combination of the resistors 38 and 39 to the emitter of the transistor 47 and the base of the transistor 45. The junction between the resistors 38 and 39 is connected to the emitter of the transistor 45. The collector of the transistor 45 is grounded via the resistor 46. The base of the transistor 40 is connected to the collector of the transistor 44 via the resistor 43. The collector of the transistor 40 is connected via the resistor 41 to the base of the transistor 45 and the emitter of the transistor 47. The emitter of the transistor 44 is grounded. The base of the transistor 44 is connected via the resistor 42 to the CPU 5 within the main controller 1. The base of the transistor 50 is connected via the resistor 49 to the positive output terminal of the charging circuit 25 (the positive output terminal of the main power supply 23). The base of the transistor 50 is connected via a series combination of the capacitor 51 and the resistor 52 to the base of the transistor 45 and the emitter of the transistor 47. The emitter of the transistor 50 is grounded. The collector of the transistor 50 is connected to the base of the transistor 47 via the resistor 48. The cathode of the zener diode 35 is connected to the positive output terminal of the charging circuit 25 (the positive output terminal of the main power supply 23). The anode of the zener diode 35 is connected to the anode of the diode 36. The cathode of the diode 36 is connected to the base of the transistor 47. The collector of the transistor 47 is connected to the main controller 1 and the radio transceiver 16.

The positive terminal of the auxiliary power source 24a is connected to the emitter of the transistor 47. The positive terminal of the auxiliary power supply 24a is connected to the positive output terminal of the charging circuit 25 (the positive output terminal of the main power supply 23) via the resistor 41, the emitter-collector path of the transistor 40, and the diode 37. The positive terminal of the auxiliary power supply 24a is connected to the CPU 5 within the main controller 1. The negative terminal of the auxiliary power source 24a is grounded.

The transistor 40 constitutes a switch for selectively connecting and disconnecting the auxiliary power source 24a to and from the charging circuit 25 (the main power supply 23). The transistor 47 constitutes a switch for selectively connecting and disconnecting the auxiliary power source 24a to and from the main controller 1 and the radio transceiver 16.

The auxiliary power source 24a and the switch 24b in the sub power supply 24 operate as follows. Normally, the CPU 5 in the main controller 1 outputs a high-level signal to the base of the transistor 44 so that the transistor 44 and also the transistor 40 are in on states (conductive states). In this case, a charging current flows from the charging circuit 25 to the auxiliary power source 24a via the diode 37, the transistor 40, and the resistor 41. Accordingly, the auxiliary power source 24a is charged by the charging current. At the same time, a positive voltage is applied to the base of the transistor 47 from the charging circuit 25 via the zener diode 35 and the diode 36 so that the transistor 47 is in an off state (a non-conductive state). Therefore, electric power is not fed from the auxiliary power source 24a to the main controller 1 and the radio transceiver 16.

When a stoppage of the ac power occurs, the positive voltage outputted from the charging circuit 25 drops below a reference voltage determined by the zener diode 35. Thus, the positive voltage applied to the base of the transistor 47 disappears. After the stoppage of the ac power, the capacitor 51 holds the transistor 50 conductive and hence the transistor 50 shunts the base of the transistor 47 to the ground. Therefore, the transistor 47 changes to an on state (a conductive state), and electric power starts to be fed from the auxiliary power source 24a to the main controller 1 and the radio transceiver 16. The transistor 47 remains conductive until the following conditions appear. When the voltage across the auxiliary power source 24a drops below a given voltage corresponding to the threshold level with respect to the transistor 50 or when the capacitor 51 is fully charged, the transistor 50 changes to an off state (a non-conductive state) so that the transistor 47 returns to the off state (the non-conductive state). Thus, the feed of the electric power from the auxiliary power source 24a to the main controller 1 and the radio transceiver 16 is suspended. In this way, the switch 24b prevents over discharge of the auxiliary power source 24a.

Figure 3:
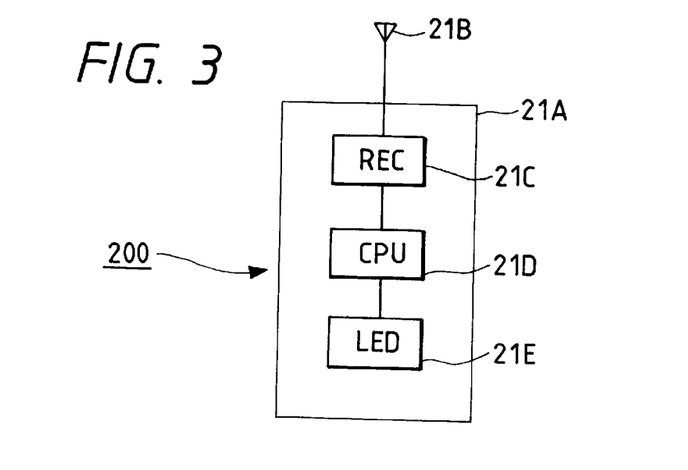
FIG. 3 is a diagram of a slave unit in the apparatus of FIG. 1.

As shown in FIGS. 1 and 3, the slave unit 200 has a body 21A and an antenna 21B. The antenna 21B is mounted on the body 21A. The body 21A contains a radio receiver 21C, a CPU 21D, and an LED (a light emitting diode) 21E. The radio receiver 21C is connected to the antenna 21B and the CPU 21D. The CPU 21D is connected to the LED 21E. It should be noted that the body 21A also contains a radio transmitter (not shown).

A radio signal transmitted from the master unit 100 is caught by the antenna 21B, being fed to the radio receiver 21C via a duplexer (not shown). The radio receiver 21C demodulates the radio signal into a speech signal or an LED-on signal. The CPU 21D is programmed to execute the following functions. The CPU 21D monitors the output signal of the radio receiver 21C, and decides whether or not the output signal of the radio receiver 21C contains an LED-on signal. When the output signal of the radio receiver 21C contains an LED-on signal, the CPU 21D intermittently activates the LED 21E. Otherwise, the CPU 21D holds the LED 21E inactive.

The cordless telephone apparatus of FIG. 1 operates as follows. When a ring signal comes from the external telephone line 3, the ring signal is transmitted via the photocoupler 11 to the ring signal detector 2. The ring signal is detected by the ring signal detector 2. The ring signal detector 2 informs the CPU 5 of the reception of the ring signal. In addition, the ring signal reaches the sounder 10. The sounder 10 produces sound in response to the ring signal.

When the user actuates the key array 22A or the slave unit 200 as a response to the ring signal, the key array 22A or the slave unit 200 generates a response signal. The response signal is transmitted to the CPU 5 from the key array 22A or the slave unit 200. When the CPU 5 receives the response signal, the CPU 5 generates and outputs a control signal to the line switch 8 so that the line switch 8 closes the external telephone line 3. Thus, the cordless telephone apparatus changes to a communication allowable state.

On the other hand, in the case where the user actuates the key array 22A to start calling, the key array 22A generates and outputs a corresponding signal to the CPU 5. The CPU 5 generates a control signal in response to the output signal of the key array 22A, and outputs the control signal to the line switch 8 so that the line switch 8 closes the external telephone line 3. In addition, the CPU 5 controls the communication device 6 so that the communication device 6 transmits a dial signal to the external telephone line 3. Then, the cordless telephone apparatus changes to the communication allowable state.

In the case where the cordless telephone apparatus is in the communication allowable state, when the slave unit 200 is required to execute communication, the CPU 5 controls the radio transceiver 16 so that the salve unit 200 can execute communication with the external telephone line 3 via the radio transceiver 16. When the external telephone line 3 is closed by the line switch 8, the local power supply 15 transfers electric power from the external telephone line 3 to the voice amplifier 14 and thereby activates the voice amplifier 14. During the communication between the slave unit 200 and the external telephone line 3, a speech signal from the slave unit 200 is amplified by the voice amplifier 14 before being outputted to the external telephone line 3. Even in the event of a stoppage of the ac power, the local power supply 15 can transfer electric power from the external telephone line 3 to the voice amplifier 14.

Since the electric power applied to the voice amplifier 14 from the external telephone line 3 via the local power supply 15 has a relatively high voltage, the voice amplifier 14 executes amplification of the speech signal with a wide dynamic range. Therefore, the speech signal outputted to the external telephone line 3 has a high quality and an adequate level. The line transformers 12 and 13 dc-isolate the voice amplifier 14 and the main power supply 23 from each other. Also, the line transformers 12 and 13 dc-isolate the voice amplifier 14 and the sub power supply 24 from each other. Accordingly, the main power supply 23 and the sub power supply 24 are isolated from the external telephone line 3.

When a stoppage of the ac power occurs, the sub power supply 24 (the auxiliary power source 24a) replaces the main power supply 23 and starts to activate the main controller 1 and the radio transceiver 16. It should be noted that the voice amplifier 14 is activated by electric power fed from the external telephone line 3 via the local power supply 15 when the external telephone line 3 is closed by the line switch 8. The main controller 1 and the radio transceiver 16 are designed to suitably operate at the rating voltage of the auxiliary power source 24a. When the voltage across the auxiliary power source 24a drops below the given voltage, the switch 24b suspends the feed of the electric power from the auxiliary power source 24a to the main controller 1 and the radio transceiver 16 to prevent over discharge of the auxiliary power source 24a.

A further description will now be given of a cordless speech mode of operation of the cordless telephone apparatus which occurs in the event of a stoppage of the ac power.

Figure 4:
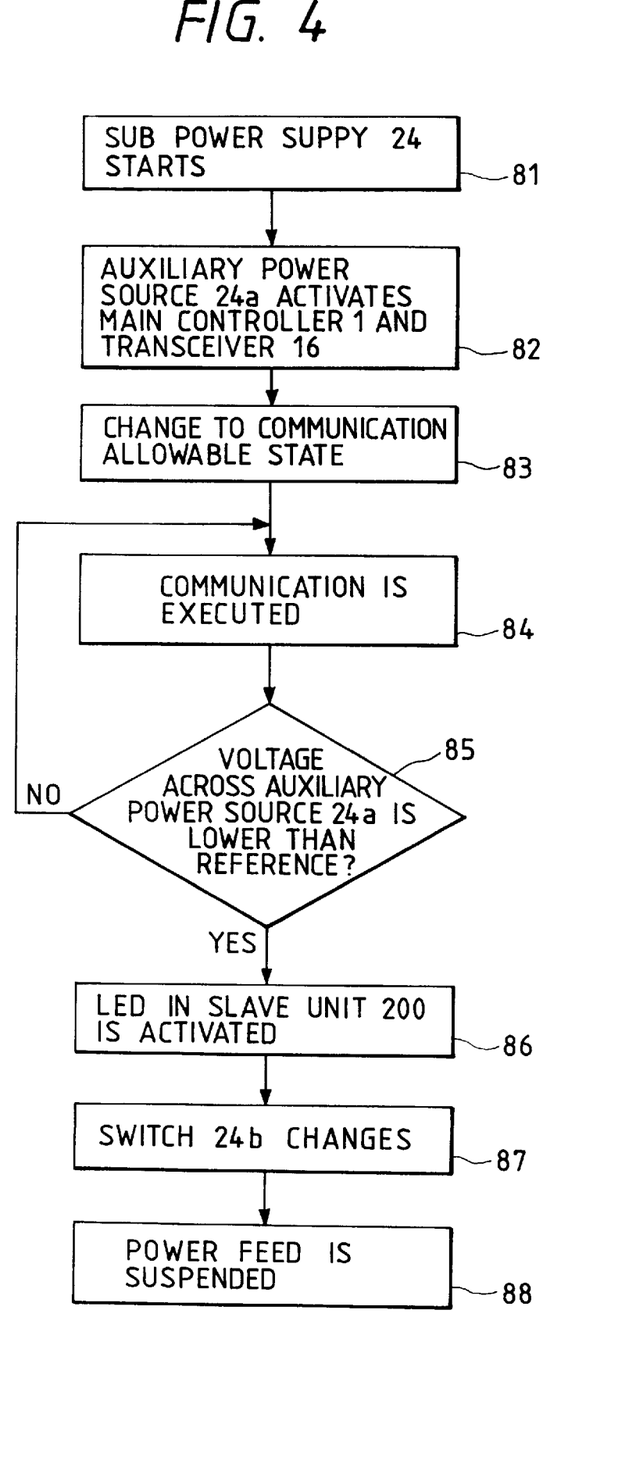
FIG. 4 is a flow diagram of operation of the apparatus in FIG. 1.

With reference to FIG. 4, in a stage 81, a stoppage of the ac power occurs. During the stage 81, the sub power supply 24 starts in response to the occurrence of the ac power failure. At a stage 82 following the stage 81, the auxiliary power source 24a activates the main controller 1 and the radio transceiver 16.

During a stage 83 following the stage 82, when the slave unit 200 requires communication, the CPU 5 controls the line switch 8 in response to the communication requirement so that the line switch 8 closes the external telephone line 3. When the external telephone line 3 is closed, the voice amplifier 14 is fed with electric power from the external telephone line 3 via the local power supply 15. During the stage 83, the CPU 5 controls the communication device 6 and the radio transceiver 16 to change the master unit 100 to a state at which communication between the slave unit 200 and the external telephone line 3 is allowed.

During a stage 84 following the stage 83, communication between the slave unit 200 and the external telephone line 3 is executed. Specifically, a radio transceiver 16 receives a speech signal from the external telephone line 3 via the main controller 1. The radio transceiver 16 converts the received speech signal into a corresponding radio signal, and transmits the radio signal to the slave unit 200. The radio transceiver 16 receives a radio signal from the slave unit 200, and converts the received radio signal into a corresponding speech signal. The radio transceiver 16 outputs the speech signal to the main controller 1. The speech signal is transmitted to the external telephone line 3 via the main controller 1 and the voice amplifier 14. The speech signal is amplified to a suitable level by the voice amplifier 14.

At a stage 85, the CPU 5 checks the voltage across the auxiliary power source 24a. The voltage check at the step 85 is periodically executed during the stage 84. The CPU 5 decides whether or not the voltage across the auxiliary power source 24a is lower than a predetermined reference voltage. When the voltage across the auxiliary power source 24a is equal to or higher than the predetermined reference voltage, the stage 84 is continued. When the voltage across the auxiliary power source 24a is lower than the predetermined reference voltage, the stage 84 is replaced by a stage 86. The predetermined reference voltage is generally higher than the given voltage at which the switch 24b suspends the feed of the electric power from the auxiliary power source 24a to the main controller 1 and the radio transceiver 16.

In the stage 86, the CPU 5 controls the radio transceiver 16 to transmit an LED-on signal to the slave unit 200. When the slave unit 200 receives the LED-on signal, the LED 21E in the salve unit 200 is periodically activated to inform the user of the drop of the voltage across the auxiliary power source 24a.

At a stage 87 following the stage 86, the switch 24b changes its state. At a step 88 subsequent to the step 87, the switch 24b suspends the feed of the electric power from the auxiliary power source 24a to the main controller 1 and the radio transceiver 16.

Thus, the switch 24b prevents over discharge of the auxiliary power source 24a.

Figure 5:
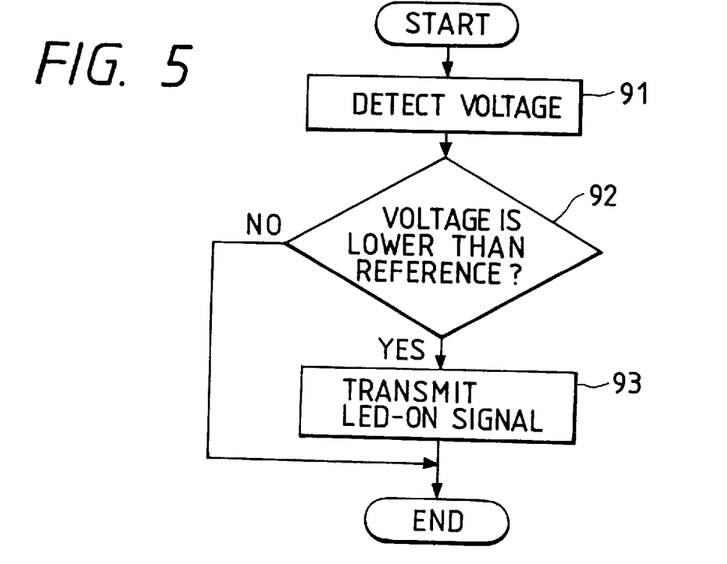
FIG. 5 is a flowchart of a subroutine of a program for controlling a CPU in the apparatus of FIG. 1.

FIG. 5 is a flowchart of a subroutine of the program for controlling the CPU 5. The subroutine of FIG. 5 is periodically reiterated. With reference to FIG. 5, a first step 91 of the subroutine detects the voltage across the auxiliary power source 24a. A step 92 following the step 91 decides whether or not the power source voltage detected by the step 91 is lower than the predetermined reference voltage. When the voltage across the auxiliary power source 24a is equal to or higher than the predetermined reference voltage, the program exits from the step 92 and the current execution cycle of the subroutine ends. When the voltage across the auxiliary power source 24a is lower than the predetermined reference voltage, the program advances from the step 92 to a step 93. The step 93 controls the radio transceiver 16 to transmit an LED-on signal to the slave unit 200. After the step 93, the current execution cycle of the subroutine ends.

Figure 6:
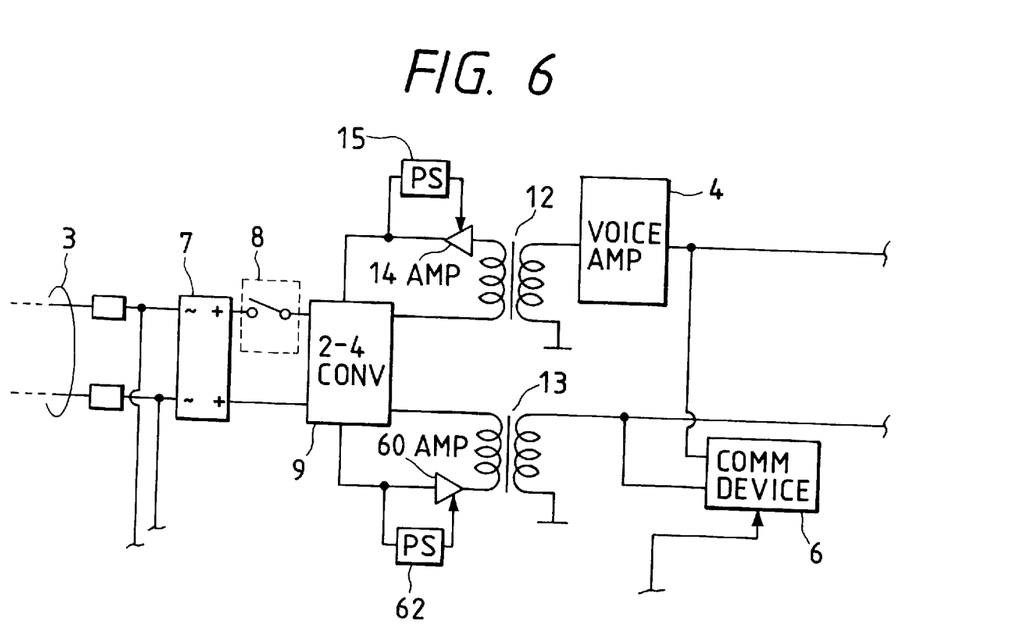
FIG. 6 is a diagram of a portion of a cordless telephone apparatus according to a second embodiment of this invention.

FIG. 6 shows a second embodiment of this invention which is similar to the embodiment of FIG. 1 except for the following additional arrangement.

The embodiment of FIG. 6 additionally includes a voice amplifier (an audio amplifier) 60 and a local power supply 62. The voice amplifier 60 is connected between the receiving-side line transformer 13 and the 2–4 converter 9. The local power supply 62 is connected to the voice amplifier 60 and the 2–4 converter 9. When the line switch 8 is closed, the local power supply 62 is connected to the external telephone line 3 via the 2–4 converter 9, the line switch 8, and the bridge rectifier 7 so that the local power supply 62 receives electric power from the external telephone line 3. The local power supply 62 derives dc power from the electric power fed by the external telephone line 3, and feeds the dc power to the voice amplifier 60. The voice amplifier 60 is activated by the dc power from the local power supply 62. Thus, the voice amplifier 62 is activated by electric power fed from the external telephone line 3.

In the case where the cordless telephone apparatus is in the communication allowable state, when the slave unit 200 is required to execute communication, the CPU 5 controls the radio transceiver 16 so that the salve unit 200 can execute communication with the external telephone line 3 via the radio transceiver 16. When the external telephone line 3 is closed by the line switch 8, the local power supply 62 transfers electric power from the external telephone line 3 to the voice amplifier 60 and thereby activates the voice amplifier 60. During the communication between the slave unit 200 and the external telephone line 3, a speech signal from the external telephone line 3 is amplified by the voice amplifier 60 before being outputted to the main controller 1. Then, the amplified speech signal is fed from the main controller 1 to the radio transceiver 16, and is transmitted by the radio transceiver 16 toward the slave unit 200 as a radio signal. Even in the event of a stoppage of the ac power, the local power supply 62 can transfer electric power from the external telephone line 3 to the voice amplifier 60.

The line transformers 12 and 13 dc-isolate the voice amplifier 60 and the main power supply 23 from each other. Also, the line transformers 12 and 13 dc-isolate the voice amplifier 60 and the sub power supply 24 from each other. Accordingly, the main power supply 23 and the sub power supply 24 are isolated from the external telephone line 3.

What is claimed is:

1. A cordless telephone apparatus for communication with a slave unit, comprising:
   a radio transceiver for cordless communication with the slave unit;
   a controller for controlling the radio transceiver;
   a main power supply for generating electric power from commercial ac power;
   an auxiliary battery for generating electric power;
   means for activating the radio transceiver and the controller by either the electric power generated by the main power supply or the electric power generated by the auxiliary battery;
   a voice amplifier connected between an external telephone line and the radio transceiver for amplifying a speech signal transmitted between the external telephone line and the radio transceiver;
   means for activating the voice amplifier by electric power fed from the external telephone line; and
   monitoring means for detecting whether or not a voltage across the auxiliary battery drops below a given voltage, and for suspending the activation of the radio transceiver and the controller by the auxiliary battery to prevent over-discharge of the auxiliary battery when the voltage across the auxiliary battery drops below the given voltage.

2. The cordless telephone apparatus of claim 1, wherein the monitoring means includes means for detecting the voltage across the auxiliary battery, means for deciding whether or not the detected voltage across the auxiliary battery is lower than a predetermined reference level, the predetermined reference level being higher than the given voltage, and means for informing the slave unit of a voltage drop when the detected voltage across the auxiliary battery is lower than the predetermined reference level.

3. The cordless telephone apparatus of claim 1, wherein the monitoring means includes means for detecting the voltage across the auxiliary battery, means for deciding whether or not the detected voltage across the auxiliary battery is lower than a redetermined reference level, an indicator provided in the slave unit, and means for activating the indicator when the detected voltage across the auxiliary battery is lower than the predetermined reference level.

4. A cordless telephone apparatus comprising:
   a master unit; and
   a slave unit;
   wherein the master unit comprises a radio transceiver for cordless communication with the slave unit; a controller for controlling the radio transceiver; a main power supply for generating electric power from commercial ac power; an auxiliary battery for generating electric power; means for activating the radio transceiver and the controller by either the electric power generated by the main power supply or the electric power generated by the auxiliary battery; a voice amplifier connected between an external telephone line and the radio transceiver for amplifying a speech signal transmitted between the external telephone line and the radio transceiver; means for activating the voice amplifier by electric power fed from the external telephone lines; and monitoring means for detecting whether or not a voltage across the auxiliary battery drops below a given voltage, and for suspending the activation of the radio transceiver and the controller by the auxiliary battery to prevent over-discharge of the auxiliary battery when the voltage across the auxiliary battery drops below the given voltage.

5. The cordless telephone apparatus of claim 4, wherein the monitoring means comprises means for detecting the voltage across the auxiliary battery, means for deciding whether or not the detected voltage across the auxiliary battery is lower than a predetermined reference level, the predetermined reference voltage being higher than the given voltage, and means for informing the slave unit of a voltage drop when the detected voltage across the auxiliary battery is lower than the predetermined reference level.

6. The cordless telephone apparatus of claim 4, wherein the monitoring means includes means for detecting the voltage across the auxiliary battery, means for deciding whether or not the detected voltage across the auxiliary battery is lower than a predetermined reference level, an indicator provided in the slave unit, and means for activating the indicator when the detected voltage across the auxiliary battery is lower than the predetermined reference level.

7. A cordless telephone apparatus comprising:
   a master unit having a main portion and an interface portion, the interface portion being connected between an external telephone line and the main portion;
   a slave unit for cordless communication with the master unit;
   a main power supply for generating electric power from commercial ac power;
   means for normally activating the main portion of the master unit by the electric power generated by the main power supply;
   an auxiliary battery for generating electric power;
   means for activating the main portion of the master unit by the electric power generated by the auxiliary battery in place of the electric power generated by the main power supply when a stoppage of the commercial ac power occurs;
   a voice amplifier provided in the interface portion of the master unit for amplifying a speech signal transmitted between the external telephone line and the main portion of the master unit;
   means for activating the voice amplifier by electric power fed from the external telephone line; and
   monitoring means for detecting whether or not a voltage across the auxiliary battery drops below a given voltage, and for suspending the activation of the main portion of the master unit by the auxiliary battery to prevent over-discharge of the auxiliary battery when the voltage across the auxiliary battery drops below the given voltage.

8. The cordless telephone apparatus of claim 7, wherein the monitoring means includes means for detecting the voltage across the auxiliary battery, means for deciding whether or not the detected voltage across the auxiliary battery is lower than a predetermined reference level, and means for informing the slave unit of a voltage drop when the detected voltage across the auxiliary battery is lower than the predetermined reference level.

9. The cordless telephone apparatus of claim 7, wherein the monitoring means comprises means for detecting the voltage across the auxiliary battery, means for deciding whether or not the detected voltage across the auxiliary battery is lower than a predetermined reference level, an indicator provided in the slave unit, and means for activating the indicator when the detected voltage across the auxiliary battery is lower than the predetermined reference level.

10. A cordless telephone apparatus comprising:

a master unit having a main portion, an interface portion connected between an external telephone line and the main portion, and means for isolating the main portion and the external telephone line from each other with respect to a direct current;

a slave unit for cordless communication with the master unit; a main power supply for generating electric power from commercial ac power;

means for normally activating the main portion of the master unit by the electric power generated by the main power supply;

an auxiliary battery for generating electric power;

means for activating the main portion of the master unit by the electric power generated by the auxiliary battery in place of the electric power generated by the main power supply when a stoppage of the commercial ac power occurs;

a voice amplifier provided in the interface portion of the master unit at a location between the external telephone line and the isolating means for sampling a speech signal transmitted between the external telephone line and the main portion of the master unit;

means for activating the voice amplifier by electric power fed from the external telephone line; and monitoring means for detecting whether or not a voltage across the auxiliary battery drops below a given voltage, and for suspending the activation of the main portion of the master unit by the auxiliary battery to prevent over-discharge of the auxiliary battery when the voltage across the auxiliary battery drops below the given voltage.

11. The cordless telephone apparatus of claim 10, wherein the monitoring means includes means for detecting the voltage across the auxiliary battery, means for deciding whether or not the detected voltage across the auxiliary battery is lower than a predetermined reference level, and means for informing the slave unit of a voltage drop when the detected voltage across the auxiliary battery is lower than the predetermined reference level.

12. The cordless telephone apparatus of claim 11, wherein the monitoring means includes means for detecting the voltage across the auxiliary battery, means for deciding whether or not the detected voltage across the auxiliary battery is lower than a predetermined reference level, an indicator provided in the slave unit, and means for activating the indicator when the detected voltage across the auxiliary battery is lower than the predetermined reference level.

* * * * *